United States Patent [19]
Rubel

[11] 3,993,156
[45] Nov. 23, 1976

[54] GUIDANCE SYSTEM FOR GUIDING TRACKLESS VEHICLES ALONG A PATH DEFINED BY AN A-C ENERGIZED CONDUCTOR

[75] Inventor: Erich Rubel, Burgstetten, Germany
[73] Assignee: Robert Bosch G.m.b.H., Stuttgart, Germany
[22] Filed: Jan. 21, 1976
[21] Appl. No.: 650,917

[30] Foreign Application Priority Data
Feb. 19, 1975  Germany............................ 2506961

[52] U.S. Cl.................................. 180/98; 318/587
[51] Int. Cl.²........................................... B62D 1/24
[58] Field of Search....................... 180/98; 318/587

[56] References Cited
UNITED STATES PATENTS
| | | | |
|---|---|---|---|
| 3,132,710 | 5/1964 | Petrella............... | 180/98 X |
| 3,606,933 | 9/1971 | Rushing............... | 180/98 |
| 3,614,990 | 10/1971 | Schnitzler............. | 180/98 |

*Primary Examiner*—Robert R. Song
*Assistant Examiner*—Terrance L. Siemens
*Attorney, Agent, or Firm*—Flynn & Frishauf

[57] ABSTRACT

A pair of main coils are arranged with their axes horizontally located, for example between the wheels, and symmetrically with respect to a longitudinal vertical plane of symmetry of the vehicle; a pair of auxiliary coils are located adjacent the horizontal coils, symmetrical with respect to said plane and having axes located at least approximately in a common vertical plane transverse to the longitudinal plane of symmetry of the vehicle, the coils including with said longitudinal plane an acute angle to open outwardly in the downward direction towards the conductor, preferably in the range of between 10° to 45°, for example about 20°. The main coils are differentially connected, the auxiliary coils are additively connected, and the output signals are divided to form a proportional ratio which forms the error signal indicative of deviation of said longitudinal plane of symmetry, at the location of the coils, from the conductor.

10 Claims, 4 Drawing Figures

GUIDANCE SYSTEM FOR GUIDING TRACKLESS VEHICLES ALONG A PATH DEFINED BY AN A-C ENERGIZED CONDUCTOR

CROSS REFERENCE TO RELATED PATENT

U.S. application Ser. No. 492,523, Maisch, now U.S. Pat. No. 3,942,087, assigned to the assignee of the present application.

The present invention relates to a system to guide trackless vehicles over a surface by means of a conductor located on, or embedded in the surface and carrying an a-c signal therein, the field generated by the conductor being scanned by coils located on the vehicle.

It has previously been proposed — see German Disclosure Document DT-OS 1,902,037 — to locate two scanning coils beneath the axles of a multi-axle vehicle. The coils are so arranged that they are symmetrically located at opposite sides of a longitudinal vertical axis extending through the vehicle. When the vehicle is positioned over the conductor, the field derived from the conductor will induce voltages in the coils. If this field derived from the conductor is properly emitted, so that it will be a completely symmetrical field with respect thereto, then, when the vehicle is symmetrically located over the conductor, the a-c voltages induced in the coils will be of equal magnitude and in phase. If the vehicle deviates to the right or to the left from the conductor, one of the coils will have a greater a-c voltage induced therein than the other and the difference between the voltages can be used to derive an error signal to control the vehicle by means of a servo system in such a manner that the voltages induced in the coils again become equal, thus restoring the vehicle to its symmetrical position over the conductor.

The afore-mentioned disclosure document also shows an arrangement in which the coils are located with their winding axes crossing at right angles, the coils being located in a common transverse plane of the vehicle. The horizontal coils which pick up the field from the conductor should be spaced from the longitudinal plane of symmetry of the vehicle by as large an extent as possible. Proper guidance of the vehicle by the aforementioned system assumes that the field emitted from the conductor is symmetrical. If, for example, due to the presence of metal objects adjacent or close to the conductor, the field becomes distorted, deviation of the vehicle from the predetermined path will result. Metal elements embedded in the running surface of the vehicle may, for example, be metal sump grids, reinforcements and armor of running surfaces, attachment covers set into the surface, and other cover plates and cover grills, as well as other elements of steel or iron, in short, any type of ferromagnetic substance located within the field of the conductor carrying the a-c current. Likewise, tools or debris accidentally dropped adjacent the conductor would distort the field.

It is an object of the present invention to provide a guidance system for trackless vehicles which is essentially immune to unsymmetrical distortions of the field so that the effective guidance with respect to the current-carrying conductor is not impaired by such distortions.

SUBJECT MATTER OF THE PRESENT INVENTION

Briefly, the pick-up system includes horizontal coils located symmetrically with respect to a central plane, or plane of symmetry of the vehicle, and two additional coils which are positioned with their axes at least approximately located in a common vertical plane extending transverse to the vehicle. The axes of the auxiliary coils include an acute angle, open downwardly towards the conductor, preferably in the range of about 10° to 45°, for example about 20° each.

The system of the present invention permits locating the horizontal coils at a relatively great height $h$ above the surface over which the vehicle operates and, further, to reduce the distance of the horizontal coils with respect to each other. The inclination of the auxiliary coils is preferably so selected that their axes intersect at a height H above the operating surface, which height is about twice the height $h$ of the axes of the horizontal coils above the operating surface.

The invention will be described by way of example with reference to the accompanying drawings, wherein.

Figure 3:
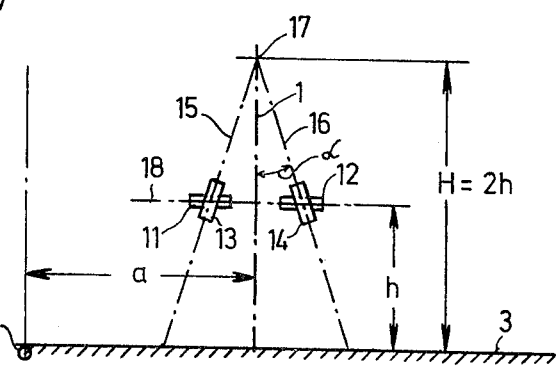
FIG. 3 is a simplified diagram showing the location of the respective coils on the vehicle.

The chain-dotted line 1 (FIGS. 1, 3) illustrates the longitudinal central plane of symmetry of a vehicle 2 (FIG. 1) operating over a surface 3. A conductor 4 is embedded in the surface 3, closely adjacent thereto. Conductor 4 carries alternating current, of a frequency for example in the audio range. The vehicle 2 should be so guided over the conductor 4 that the longitudinal plane of symmetry 1 should pass at all times through the conductor 4, or have as little deviation therefrom as possible.

Figure 1:
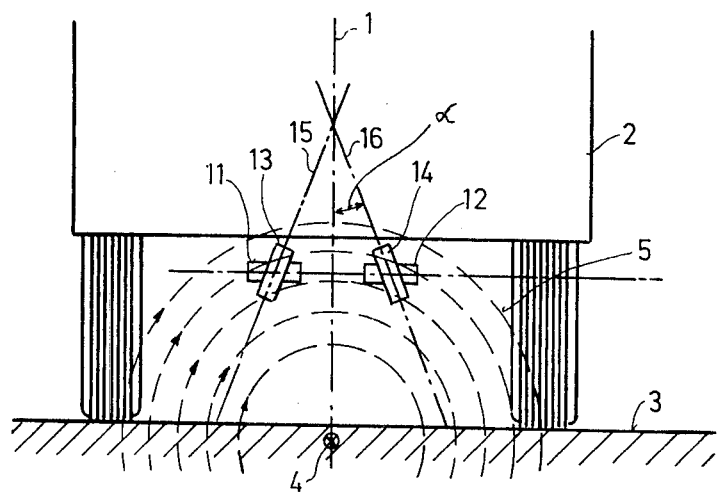
FIG. 1 is a highly schematic transverse cross section through a portion of a vehicle operating over a surface in which a current-carrying conductor is embedded.

Conductor 4, when supplied with an audio frequency, will generate a magnetic field thereabout, indicated by broken lines 5 (FIG. 1). This field, when not subject to distortion, will be concentric with respect to the conductor 4. The vehicle 2 is provided with two coils 11, 12 located horizontally beneath the chassis thereof. In accordance with the present invention, two additional auxiliary coils 13, 14 are provided, so located that they are exposed to the electromagnetic alternating field generated by conductor 4 when energized. The two horizontal coils 11, 12 are coaxial with respect to each other and are located symmetrically with respect to the central longitudinal plane, spaced relatively little from the plane with respect to the permissible width of deviation from conductor 4. The two auxiliary coils 13, 14 are located immediately adjacent the horizontal coils 11, 12. They are so secured to the vehicle that the axes 15, 16 of coils 13, 14 are disposed in a common vertical transverse plane of the vehicle. The angle of inclination of the axes 15, 16 of the coils 13, 14 are symmetrical, and include a downwardly open angle $\alpha$. This acute angle $\alpha$ can be between 10° and 45°; preferably, and as indicated in the drawing, it should be approximately 20°. The intersecting point 17 (FIG. 3) of the axes 15, 16 of the auxiliary coils 13, 14 with the central longitudinal plane of symmetry 1 of the vehicle 2, is located at a height H over the operating surface 3 which is about twice the vertical distance $h$ of the common axis 18 of the two horizontal coils 11, 12 from the operating surface 3.

Figure 4:
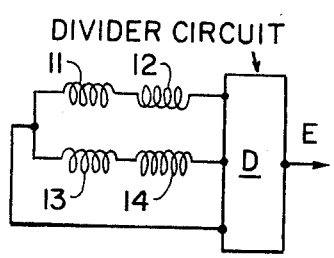
FIG. 4 is a highly schematic fragmentary block diagram showing the connection of the coils and an associated control system to provide an error output signal.

The horizontal coils 11, 12 are serially connected and so poled that the free ends of the coil provide a difference voltage (FIG. 4). This difference voltage will be the difference of the induced voltage $U_1$ induced in coil 11 and the induced voltage $U_2$ in the second horizontal coil 12. The difference voltage, in dependence on the deviation a of the plane of symmetry 1 from conductor 4, is shown at curve 20. Auxiliary coils 13, 14 are serially, additively connected so that the induced voltages $U_3$ and $U_4$ will provide a sum voltage $U_3 + U_4$, indicated by curve 21 in FIG. 2. When the condition $H = 2h$ is met, then forming a quotient of the voltages of curves 20 and 21 will result in a linear deviation function $$U(a) = \frac{U_1 - U_2}{U_3 + U_4} = m \cdot a \qquad (1)$$

wherein $m$ is a proportionality factor.

Figure 2:
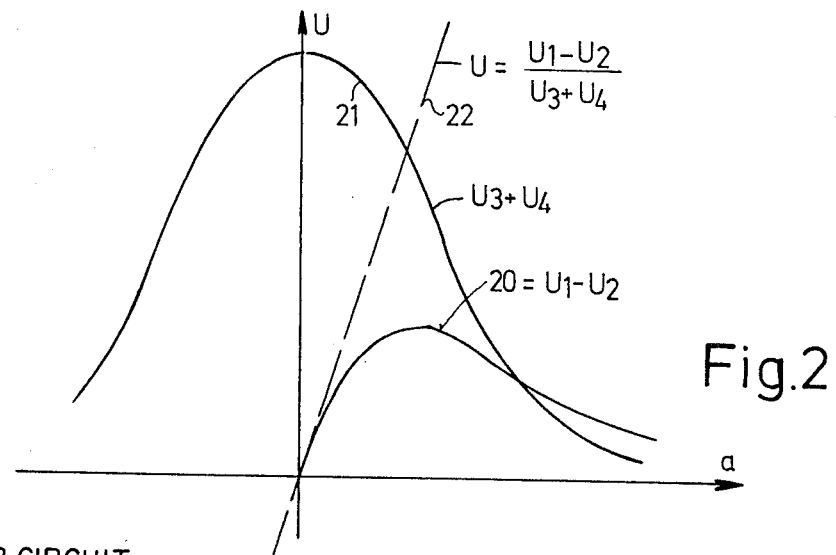
FIG. 2 is a series of graphs illustrating relative values of induced sum and difference voltages.

The voltage $U(a)$ is calculated in a divider circuit D to which the sum and difference voltages, as shown in FIG. 2, are respectively applied, to derive therefrom an error voltage E. This error voltage E can be applied to the customary servo or control systems (not shown) which so control the position of the steering mechanism of vehicle 2 to null the error signal, so that the deviation a from the conductor 4 becomes a minimum even if the field is unsymmetrically distorted.

Combination of the inclined position of the auxiliary coils 13, 14 and the comparatively small axial distance of the horizontal coils 11, 12 provides an arrangement which is essentially immune to disturbances due to unsymmetrical field distribution within a working range of $a = \pm h/2$.

The auxiliary coils 13, 14 are preferably so located with respect to coils 11, 12 that they are located halfway above and halfway below the horizontal axis 18 common to the coils 11, 12.

Various changes and modifications may be made within the scope of the inventive concept.

I claim:

1. Guidance system for guiding a trackless vehicle to operate on a surface (3) along a path defined by a guide conductor (4) located on or in the surface and having an a-c flowing therein and an a-c field thereabout, comprising
   at least two horizontal coils (11, 12) located on the vehicle and having a common horizontal winding axis (18), positioned symmetrically with respect to a vertical longitudinal central plane of symmetry (1) between the wheels of the vehicle (2);
   and two auxiliary coils (13, 14) respectively located adjacent the horizontal coils (11, 12) and symmetrical with respect to said longitudinal plane of symmetry, and having winding axes (15, 16) located at least approximately in a common vertical plane transverse to said longitudinal plane, each coil including an acute angle ($\alpha$), open towards a conductor (4) with said longitudinal plane of symmetry (1).

2. System according to claim 1, wherein the included angle of the axis (15, 16) of an auxiliary coil (13, 14) with respect to said longitudinal vertical plane of symmetry (1) is between about 10° and 45°.

3. System according to claim 2, wherein said angle is in the order of approximately 20°.

4. System according to claim 2, wherein the auxiliary coils (13, 14) are located approximately with half their length above and half their length below the horizontal winding axis (18) of the horizontal coils (11, 12).

5. System according to claim 2, wherein the horizontal coils (11, 12) are differentially connected together to form a difference voltage ($U_1 - U_2$); and the auxiliary coils (13, 14) are additively connected together to form a sum voltage ($U_3 + U_4$).

6. System according to claim 5, further comprising a division network (D) having said difference voltage and said sum voltage applied thereto and forming a proportion voltage, said proportion voltage being representative of the error voltage (E) of deviation of the position of the longitudinal plane of symmetry (1) at the position of the coils from the conductor (4).

7. System according to claim 5, wherein the apex of intersection of the axes (15, 16) of the auxiliary coils is located at a distance (H) from the surface which is twice the distance ($h$) of the horizontal axis (18) of the horizontal coils (11, 12) from said surface ($H = 2h$).

8. System according to claim 6, wherein the apex of intersection of the axes (15, 16) of the auxiliary coils is located at a distance (H) from the surface which is twice the distance ($h$) of the horizontal axis (18) of the horizontal coils (11, 12) from said surface ($H = 2h$).

9. System according to claim 7, wherein said angle is approximately 20°.

10. System according to claim 8, wherein said angle is approximately 20°.

* * * * *